United States Patent
Ishii et al.

(10) Patent No.: US 9,645,334 B2
(45) Date of Patent: May 9, 2017

(54) OPTICAL TRANSCEIVER HAVING HEAT-DISSIPATING PATH FROM ASSEMBLY SUBSTRATE DIRECTLY TO UPPER HOUSING

(71) Applicant: Sumitomo Electric Industries, Ltd., Osaka-shi (JP)

(72) Inventors: Kuniyuki Ishii, Yokohama (JP); Hiromi Kurashima, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/050,952

(22) Filed: Feb. 23, 2016

(65) Prior Publication Data

US 2016/0246019 A1 Aug. 25, 2016

(30) Foreign Application Priority Data

Feb. 24, 2015 (JP) ................................. 2015-033832

(51) Int. Cl.
G02B 6/42 (2006.01)
G02B 6/38 (2006.01)

(52) U.S. Cl.
CPC ......... *G02B 6/4272* (2013.01); *G02B 6/4246* (2013.01); *G02B 6/4249* (2013.01); *G02B 6/4269* (2013.01); *G02B 6/4284* (2013.01); *G02B 6/3885* (2013.01); *G02B 6/428* (2013.01); *G02B 6/4292* (2013.01)

(58) Field of Classification Search
None
See application file for complete search history.

(56) References Cited

U.S. PATENT DOCUMENTS

| 9,329,349 B2* | 5/2016 | Ben David | G02B 6/4268 |
| 2006/0056765 A1* | 3/2006 | Hwang | G02B 6/43 385/39 |
| 2008/0226228 A1* | 9/2008 | Tamura | G02B 6/4214 385/33 |
| 2009/0136236 A1* | 5/2009 | Glebov | G02B 6/4214 398/139 |
| 2009/0297099 A1* | 12/2009 | Benjamin | G02B 6/25 385/32 |

(Continued)

FOREIGN PATENT DOCUMENTS

| JP | 2011-107201 A | 6/2011 |
| JP | 2011-141443 A | 7/2011 |

*Primary Examiner* — Jerry Rahll
(74) *Attorney, Agent, or Firm* — Venable LLP; Michael A. Sartori; Laura G. Remus

(57) ABSTRACT

A pluggable optical transceiver that enhances the heat dissipation function is disclosed. The optical transceiver provides the MPO connector that receives an external MT ferrule, the assembly substrate that installs a semiconductor optical device, a lens block that bends the optical axis of the semiconductor optical device by about 90°, the circuit board electrically connected to the assembly substrate, the inner fiber optically couples the MPO connector with the lens block, and the top and bottom housings that installs the MPO connector, the assembly substrate, the circuit board, and the inner fiber therein. The bottom housing mounts the circuit board, while, the assembly substrate is thermally and physically in contact to the top housing through a thermal grease.

11 Claims, 12 Drawing Sheets

(56) References Cited

U.S. PATENT DOCUMENTS

| | | | |
|---|---|---|---|
| 2011/0064358 A1* | 3/2011 | Nishimura | G02B 6/4214 385/33 |
| 2013/0168537 A1* | 7/2013 | Shin | G02B 6/4206 250/216 |
| 2014/0348462 A1* | 11/2014 | Yabre | G02B 6/42 385/14 |
| 2014/0369651 A1* | 12/2014 | Ben David | G02B 6/4268 385/89 |
| 2015/0016786 A1* | 1/2015 | Chang | G02B 6/4204 385/93 |
| 2015/0286016 A1* | 10/2015 | Arao | G02B 6/4292 385/79 |
| 2015/0331208 A1* | 11/2015 | Moriyama | H01L 31/0232 385/14 |
| 2015/0362685 A1 | 12/2015 | Shah | |
| 2016/0202434 A1* | 7/2016 | Masahiko | G02B 6/32 385/14 |

* cited by examiner

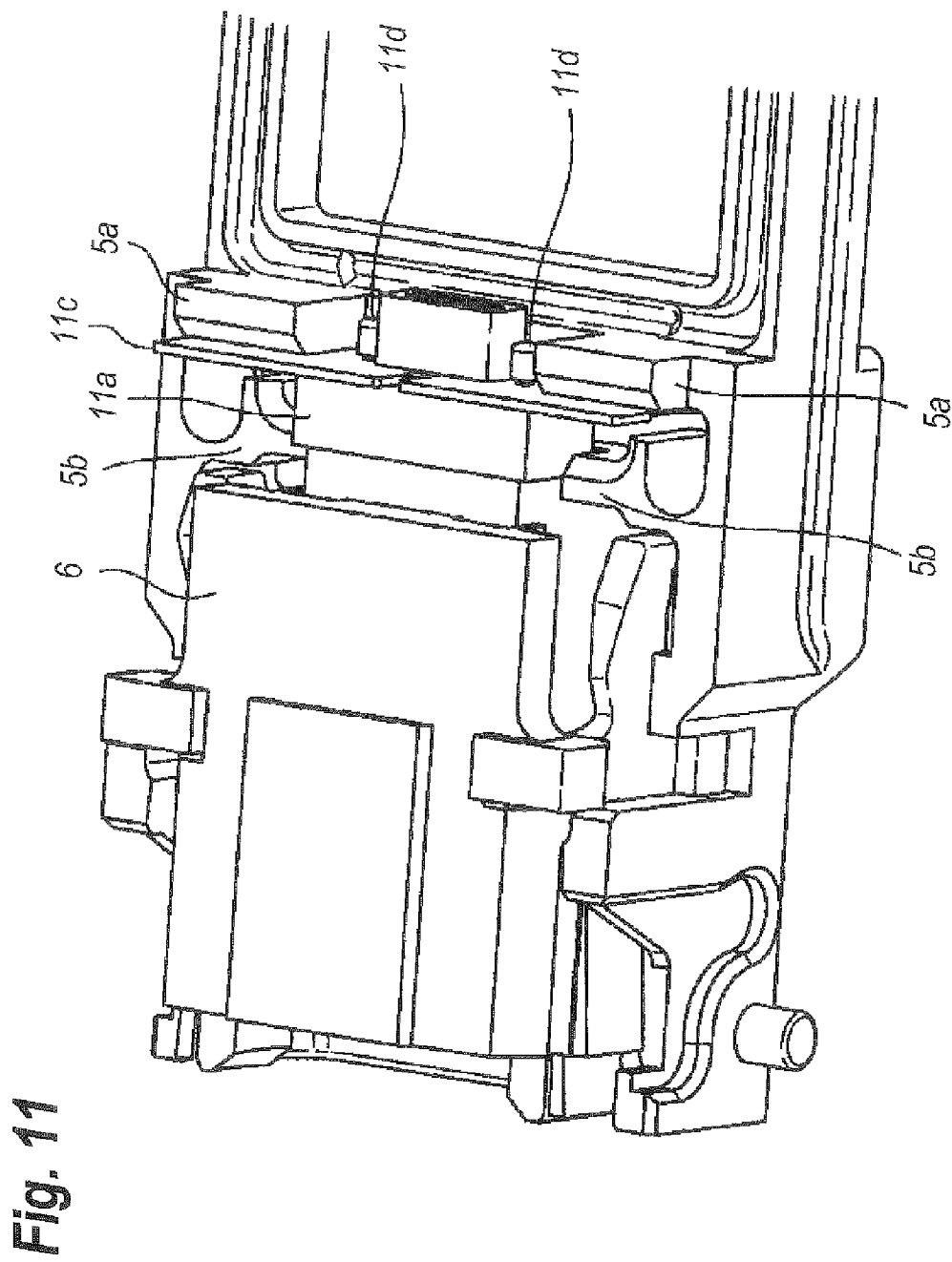

# OPTICAL TRANSCEIVER HAVING HEAT-DISSIPATING PATH FROM ASSEMBLY SUBSTRATE DIRECTLY TO UPPER HOUSING

BACKGROUND OF THE INVENTION

1. Field of the Invention

The present application relates to an optical transceiver, in particular, to an optical transceiver providing an assembly substrate that mounts a semiconductor optical device and a lens block for converting an optical axis of the semiconductor optical device.

2. Related Background Arts

One type of an optical module that implements both functions of an optical transmission and an optical reception is often called as an optical transceiver. The optical transceiver installs a laser diode (hereinafter denoted as LD) as a light transmitting device and a photodiode (hereinafter denoted as PD) as a light receiving device. An optical transceiver may further install a driver that drives the LD and an amplifier that amplifies an electrical signal output from the PD. As the optical communication system increases the transmission speed thereof, the optical devices implemented in the system generate more heat and become necessary to dissipate heat further efficiently.

SUMMARY OF THE INVENTION

An aspect of the present application relates to an optical transceiver that is to be plugged into a cage prepared in the host system. The optical transceiver includes a multi-fiber push-on (MPO) connector, an assembly substrate, a lens block, a circuit board, at least one inner fiber, and a housing. The MPO connector receives an external optical connector. The assembly substrate mounts at least one semiconductor optical device thereon, where the semiconductor optical device has an optical axis substantially in perpendicular to a primary surface of the assembly substrate. The lens block, which is mounted on the assembly substrate, bends the optical axis of the semiconductor optical device toward a direction substantially in parallel to the primary surface of the assembly substrate. The circuit board mounts electronic circuits that are electrically coupled with the semiconductor optical device. The inner fiber optically couples the lens block with the MPO connector. The housing includes a top housing and a bottom housing forming an inner space where the MPO connector, the assembly substrate, the lens block, the circuit board, and the inner fiber are installed therein. A feature of the optical transceiver of the present application is that the bottom housing mounts the circuit board thereon, and the top housing is thermally and physically in contact to the assembly substrate.

DESCRIPTION OF DRAWINGS

The foregoing and other purposes, aspects and advantages will be better understood from the following detailed description of a preferred embodiment of the invention with reference to the drawings, in which:

FIG. 11 is a perspective view of an optical receptacle including an MPO (Multi fiber Push-On) clip mated with an MT ferrule.

DESCRIPTION OF EMBODIMENTS

Next, some embodiments according to the present invention will be described as referring to accompanying drawings. In the description of the drawings, numerals or symbols same with or similar to each other will refer to elements same with or similar to each other without overlapping explanations.

Figure 1:
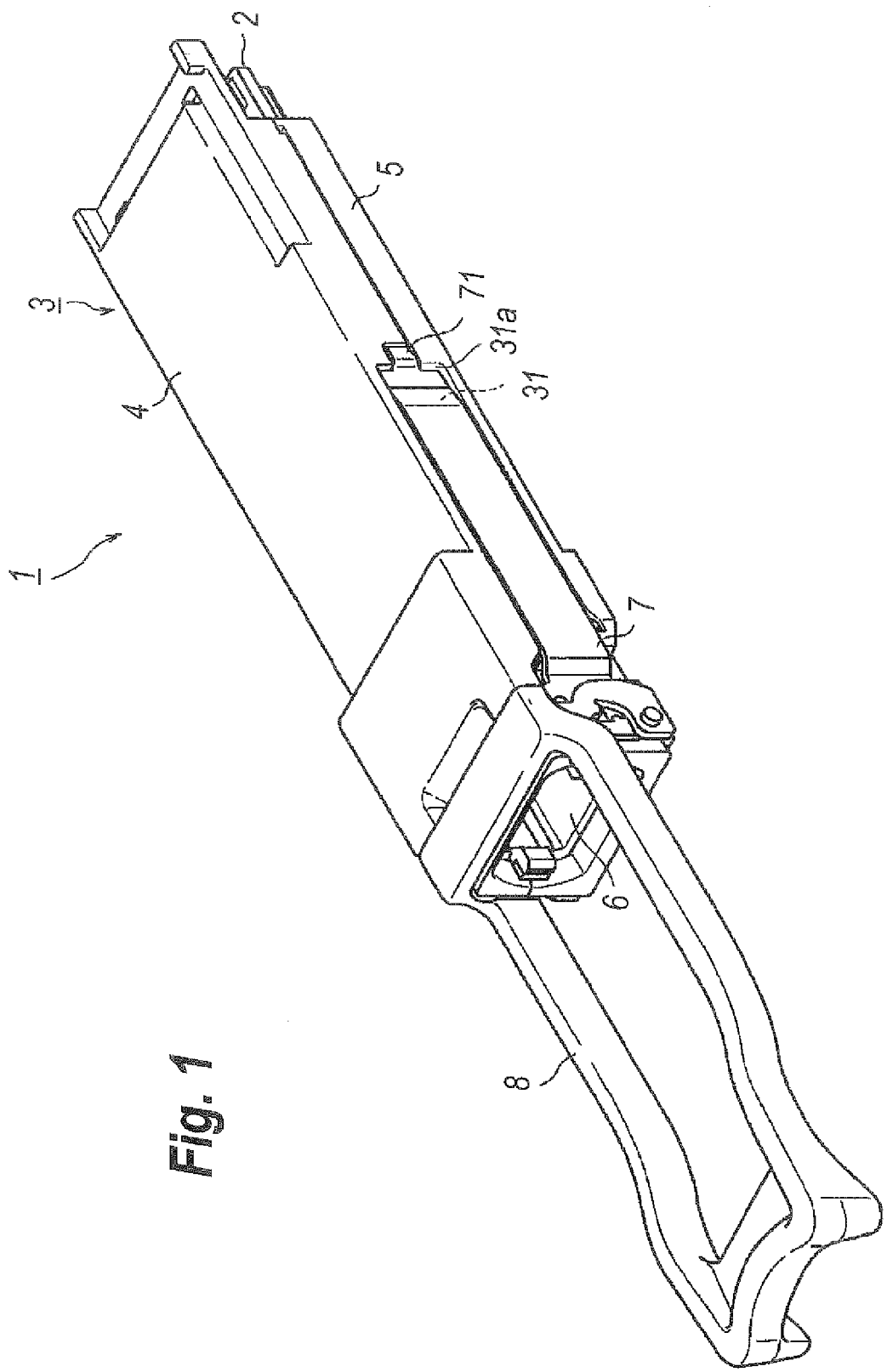
FIG. 1 is a perspective view of an optical transceiver according to an embodiment of the present application.

FIG. 1 is a perspective view of an optical transceiver according to an embodiment of the present application. An optical transceiver 1 shown in FIG. 1 is a type of, what is called, the pluggable optical transceiver which is plugged within the host system without turning off the power of the system. Accordingly, such an optical transceiver is often called as the hot pluggable optical transceiver. Moreover, the optical transceiver 1 of FIG. 1 implements two or more lanes or channels for the optical transmission and the optical reception.

The optical transceiver 1 includes, within a housing 3, an assembly substrate that mounts semiconductor optical devices and electrical devices such as laser drivers and pre-amplifiers, and a circuit board 2 that mounts electronic circuits thereon. The housing 3 includes a top housing 4 and a bottom housing 5 sandwiching the circuit board 2 therebetween, as the bottom housing 5 mounts the circuit board 2 thereon. The top housing 4 and the bottom housing 5 may be made of metal die-casting of, for instance, aluminum (Al) and/or zinc (Zn) alloy.

The optical transceiver 1 further includes an optical receptacle of a multi-fiber push-on (MPO) connector 6 in one end thereof, sliders 7 in both sides of the housing 3, and a pull-tab 8 continuous to and extending from the sliders 7, where the pull-tab 8 assists the extraction of the optical transceiver 1 from the host system. In the description below, a side where the MPO connector 6 and the pull-tab 8 are provided will be called as the front, and another side will be called as the rear. However, those directions of the front and the rear may not affect the scope of the present invention.

Figure 3:
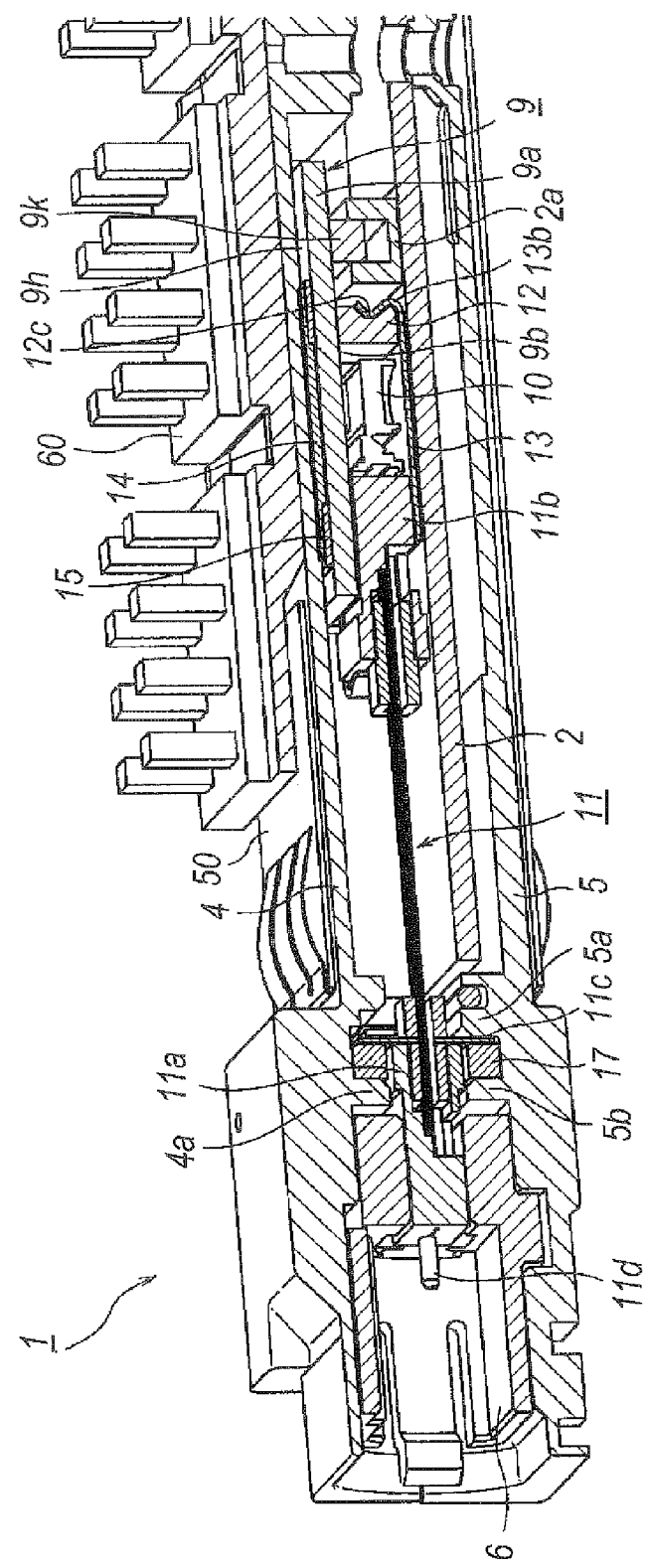
FIG. 3 shows a cross section of a front portion of the optical transceiver shown in FIG. 1.

The sliders 7 provide projections 71 protruding outwardly in respective rear ends. Also, the sliders 7 are bent in portions close to the respective rear ends. When the optical transceiver 1 is set within a cage 50, which is shown in FIG. 3, the projections 71 are set within respective pockets 31 of the housing 3 so as not to extrude from the sides of the optical transceiver 1, and a rear wall 31a of the pocket 31 latches the tab of the cage such that the optical transceiver 1 is unable to be slip out from the cage. Pulling the pull-tab 8 frontward so as to slide the slider 7 frontward, the rear portion of the slider 7 including the projection 71 is pushed outwardly, which also pushes the tab of the cage and the optical transceiver 1 is able to be extracted from the cage.

Figure 2:
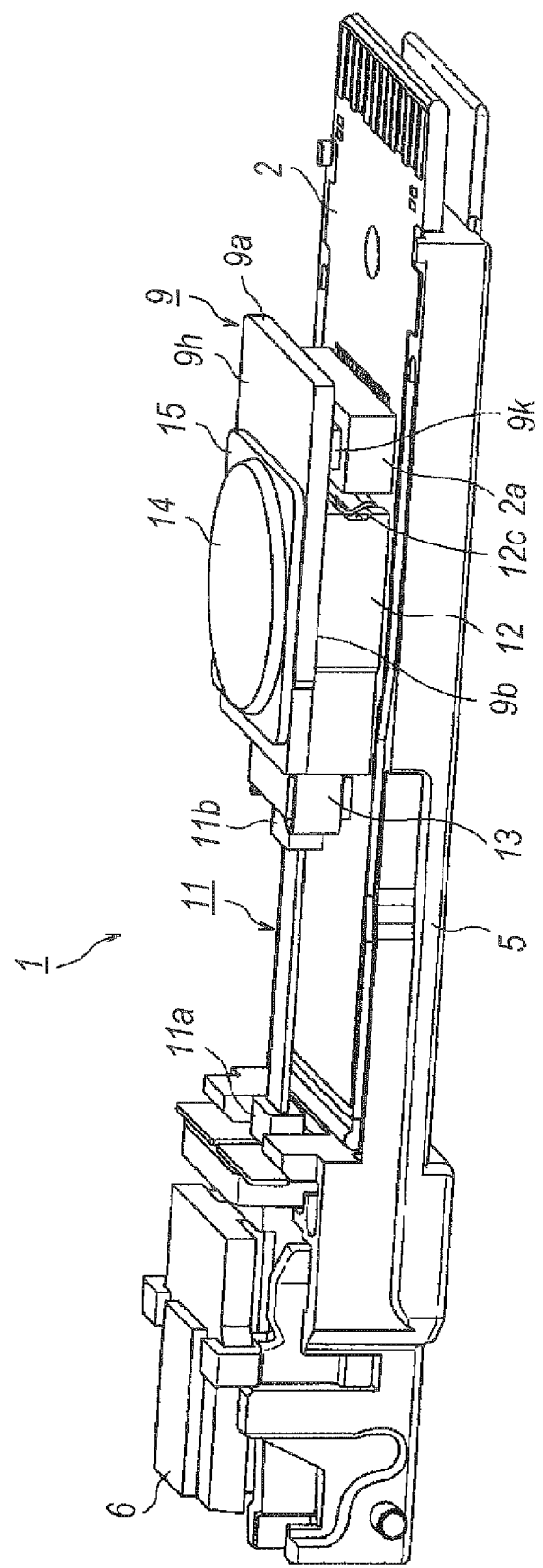
FIG. 2 shows an inside of the optical transceiver shown in FIG. 1.

FIG. 2 shows an inside of the optical transceiver 1 and FIG. 3 shows a cross section of a front portion of the optical transceiver 1 in a case where the optical transceiver 1 is set in the cage that provides a heat sink 60 in a ceiling thereof. FIG. 2 omits the top housing 4, the slider 7, and the pull-tab 8; and FIG. 3 omits the pull-tab 8. The optical transceiver 1 installs in an inner space formed by the top and bottom housings, 4 and 5, an assembly substrate 9, a lens block 10, inner fibers 11, a holder 12, and a clip 13 in addition to aforementioned circuit board 2 and MPO connector 6. The lens block 10 in a whole portion thereof is hidden by the holder 12.

Referring to FIG. 3, the assembly substrate 9 installs semiconductor optical devices such as a semiconductor laser diode (LD), and electronic devices such as a driver on a base 9a of the assembly substrate 9. The base 9a provides a bottom surface 9b that mounts the optical and electrical components thereon, and a top surface 9h that is thermally and physically attached to an inner surface of the top housing 4 through thermal grease 14. The thermal grease 14 is a gelled member having relatively good thermal conductivity. Provided between the top housing 4 and the top surface 9h of the assembly substrate 9 is a frame 15 surrounding the thermal grease 14. The frame 15, which may be made of electrically conductive and elastic material, prevents the thermal grease 14 from spreading outwardly.

The lens block 10 converts an optical axis of the semiconductor optical device mounted on the assembly substrate 9 toward a mechanically transferable (hereinafter denoted as MT) ferrule 11a set in the MPO connector 6. The lens block 10 is surrounded by the holder 12. The inner fibers 11, which optically couple the MT ferrule 11a of the MPO connector 6 with the lens block 10, provides the MT ferrules, 11a and 11b, in respective ends thereof. The inner fibers 11 may be independent from each other, or may be an arrayed fiber including a plurality of fibers assembled in side by side. Because the inner fibers 11 each have excess lengths between the two MT ferrules, 11a and 11b, positional deviations of the MPO connector 6 and that of the lens block 10 may be absorbed. The holder 12, which is inserted between the assembly substrate 9 and the circuit board 2, has a function of a spacer to secure a space between the assembly substrate 9 and the circuit board 2. The holder 12 also has a function to fix or to position the MT ferrule 11b against the lens block 10 cooperating with the clip 13.

Setting the optical transceiver 1 within the cage 50, the top housing 4 is in contact to the heat sink 60. Because the top surface 9h of the assembly substrate 9 is thermally in contact to the top housing 4 through the thermal grease 14 as described above, the optical transceiver 1 of the embodiment may externally dissipate heat generated by the electrical devices and the optical devices mounted on the assembly substrate 9 through the heat sink 60 of the cage 50. Also, because the assembly substrate 9 is mounted on a portion of the top housing 4 just beneath the heat sink 60, the heat conducting path from the optical device and the electrical device to the heat sink 60 may be shortened. The assembly substrate 9 is preferable to be formed wider to enhance the heat dissipating function.

The optical transceiver 1 provides electrical connectors that couples the optical devices and the electrical devices on the assembly substrate 9 with the circuits mounted on the circuit board 2. The optical transceiver 1 of the present embodiment implements, what is called, stack connectors, 2a and 9k, in respective boards. A stack connector is a type of a surface mountable connector. A feature of the optical transceiver 1 of the embodiment is that a position of the assembly substrate 9 relative to the circuit board 2 is determined only by the stack connectors, 2a and 9k. That is, mating the stack connector 9k on the assembly substrate 9 with the stack connector 2a on the circuit board 2, not only the electrical connection is secured between the devices on the assembly substrate 9 and the circuits on the circuit board 2 but the position of the assembly substrate 9 with respect to the circuit board 2 may be automatically determined.

Figure 4A:
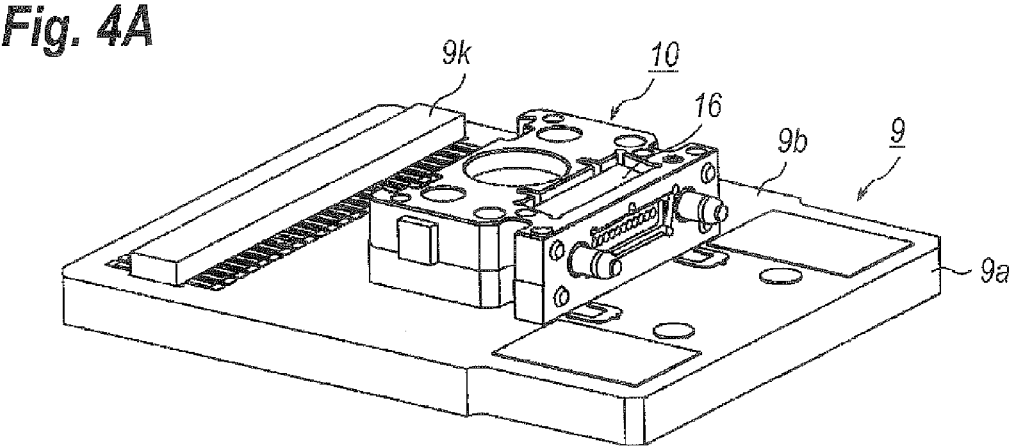
FIG. 4A is a perspective view of an assembly substrate and a lens block and FIG. 4B shows a cross section of the lens block mounted on the assembly substrate.
Figure 4B:
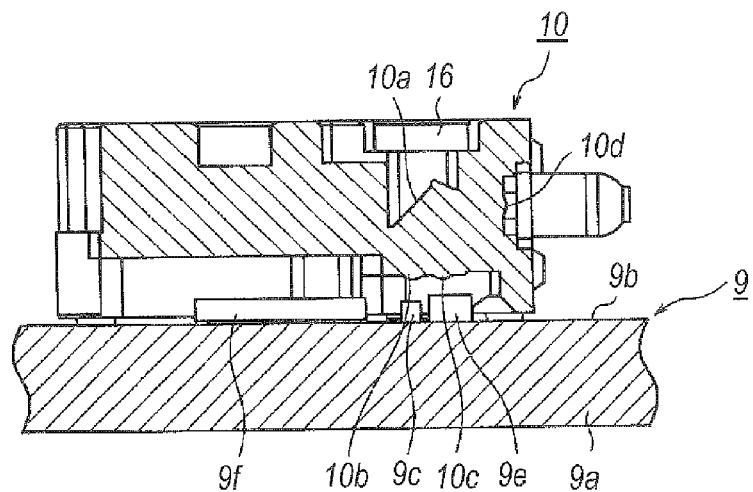
Figure 5A:
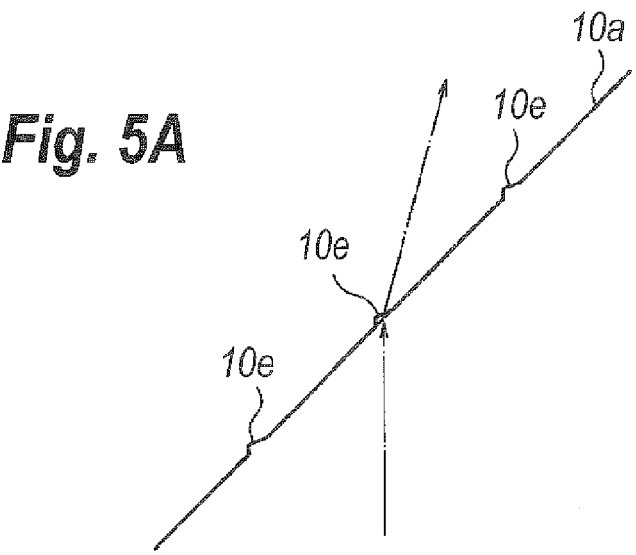
FIG. 5A shows details of the blip surface and FIG. 5B shows the lens block viewed from the bottom thereof.
Figure 5B:
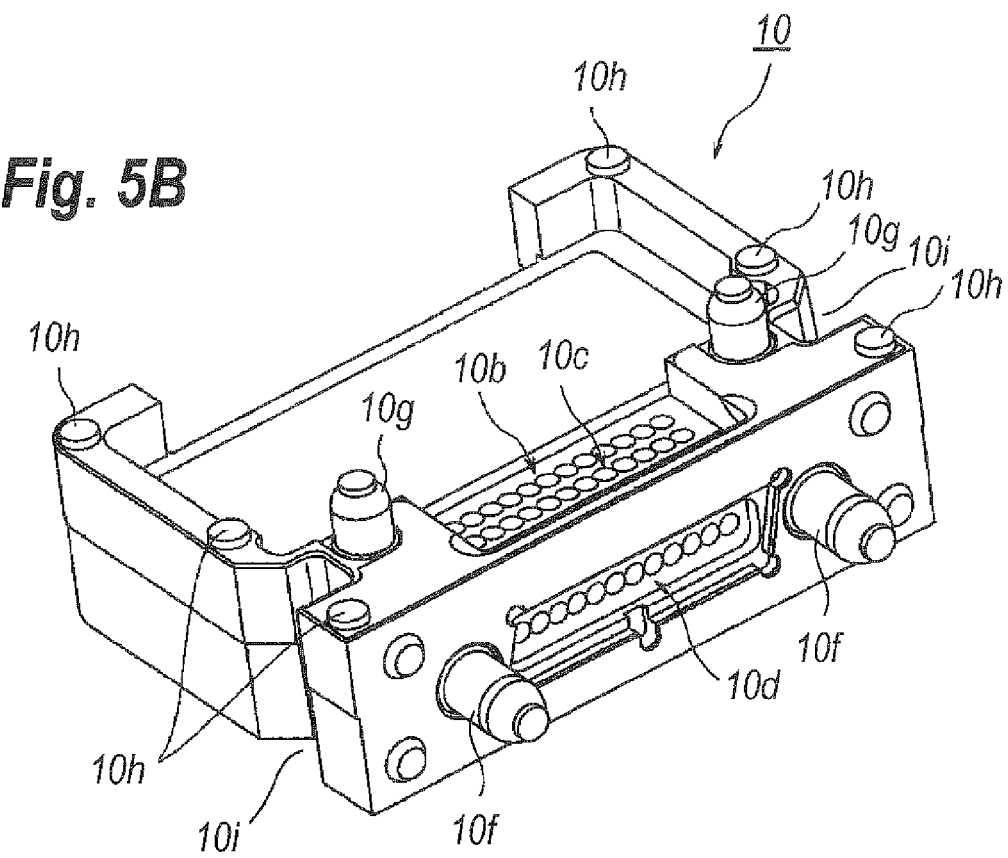
Figure 6:
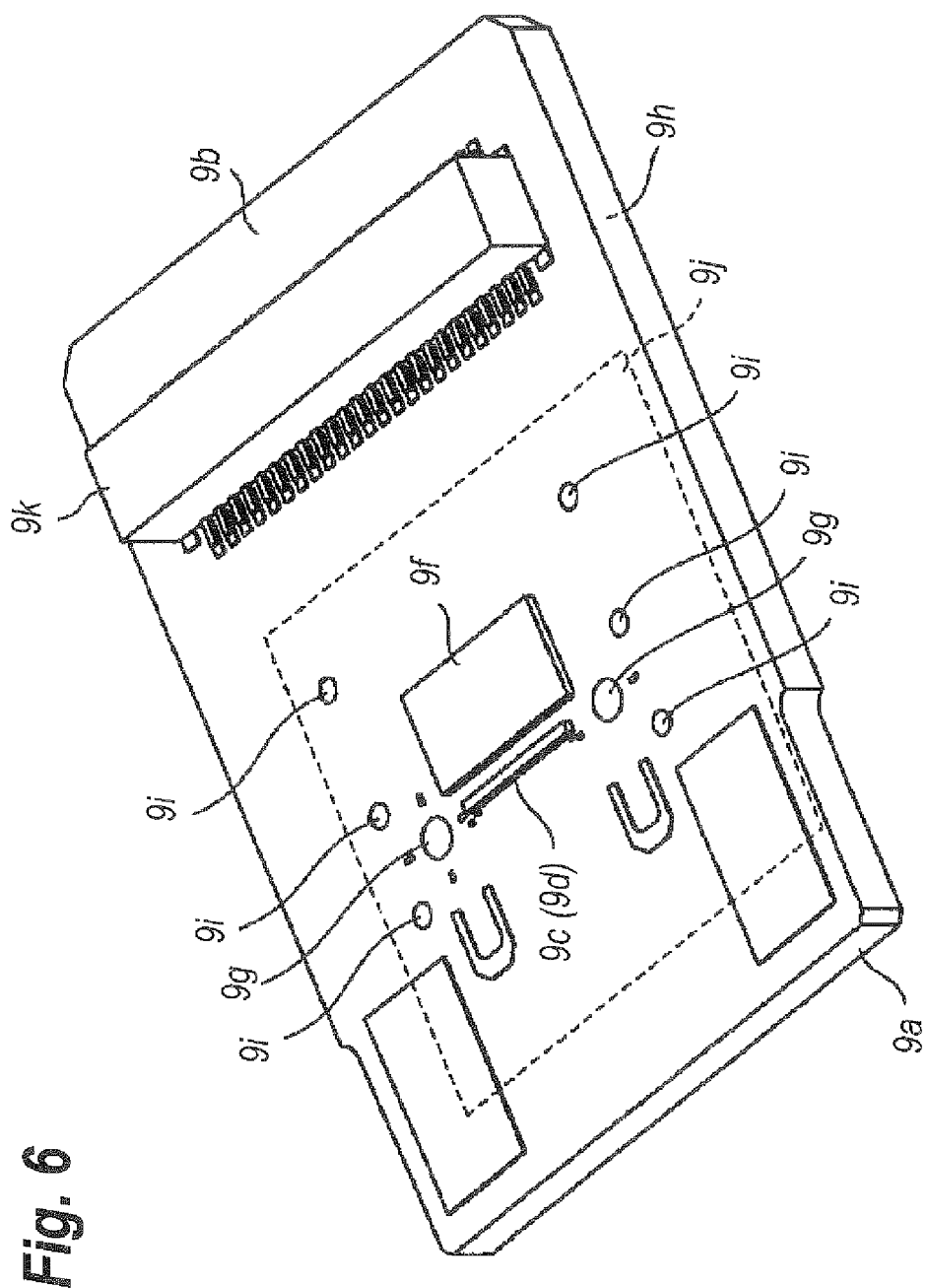
FIG. 6 is a perspective view of the assembly substrate.

FIGS. 4A to 6 describe details of the lens block 10, where FIG. 4A views the lens block 10 on the assembly substrate 9 from the front bottom, FIG. 4B shows the side cross section of the lens block 10 on the assembly substrate 9, FIG. 5A shows details of a reflecting surface 10a in the lens block 10, FIG. 5B shows the lens block 10 viewed from the front top, and FIG. 6 shows the assembly substrate 9 viewed from the front bottom.

As shown in FIGS. 4A and 4B, the assembly substrate 9 mounts an LD 9c on the bottom surface 9b thereof. In the present embodiment, the LD 9c may include a plurality of LD elements of a type of the vertical cavity surface emitting laser diode (VCSEL) in an arrayed arrangement. The LD 9c emits optical signals toward a direction perpendicular to the assembly substrate 9. Each of the LD elements emit optical signals having wavelengths substantially same to each other. Although the optical transceiver 1 of the present embodiment is not directed to have a function of the wavelength division multiplexing (hereafter denoted as WDM), but may implement this function of the WDM by selecting the LD elements.

Referring to FIG. 6, the assembly substrate 9 also mounts a photodiode (PD) 9d in side by side with respect to the LD 9c. The PD 9d integrates a plurality of PD elements in the arrayed arrangement similar to the LD 9c. The PD 9d receives optical signals provided from the MPO connector 6. Also, referring to FIG. 4B, the assembly substrate 9 mounts a monitor PD (hereinafter denoted as mPD) 9e in the side of LD 9c. The mPD 9e also integrates PD elements in the arrayed form each sensing the optical signals emitted from the LD elements in the LD 9c. The assembly substrate 9 may further mount the electronic devices such as a driver 9f for driving the LD 9c and a preamplifier and/or a main amplifier to amplify faint signals output from the PD 9d. These electronic devices are preferable to be mounted close enough to respective optical devices, 9c and 9d.

The assembly substrate 9 also mounts lens block 10 so as to cover the semiconductor optical devices, 9c and 9d. The lens block 10 provides a reflecting surface 10a that makes an angle of 45° against the bottom surface 9b of the assembly substrate 9. The lens block 10 also provides lens elements, 10b to 10d, that may collimate the optical signals output from the LD 9c and concentrates the optical signals provided from the MPO connector 6 onto the PD 9d. The lens block 10 may be made of resin and provides these collimating and/or concentrating lenses, 10b to 10d, on respective surfaces thereof. The lens block 10 further provides a mirror 16 that reflects optical signals passing through the reflecting surface 10a toward the mPD 9e.

The optical signals output from respective LD elements dispersively are converted into collimated beams by the lens element 10b formed in the surface of the lens block 10, bent the optical axis thereof by 90° by the reflecting surface 10a toward the MPO connector 6, and concentrated on the ends of the inner fibers 11 secured in the MT ferrule 11b attached to the lens block 10 by the lens elements 10d provided in the surface of the lens block 10. The reflecting surface 10a of the lens block according to the present embodiment, as shown in FIG. 5A, provides blips 10e. The blips 10e have transmitting surface whose angle against the assembly substrate 9 is different from that of the reflecting surface 10a. Portions of the respective optical beams entering the blips 10e are refracted at the transmitting surface of the blips 10e, advances to the mirror 16 and reflected by the mirror 16. The optical signals reflected by the mirror 16 advances to the assembly substrate 9 and are refracted at the surface of the lens block 10, concentrated by the lens elements 10c formed in side by side of the former lens elements 10b, and finally enter the mPD 9e. Thus, the reflecting surface 10a, by forming the blips thereat, may extract the portions of the optical signals and enable the mPD 9e mounted on the assembly substrate 9 to sense intensity of the optical signals. When the reflecting surface 10a provides no blips, the optical signals output from the LD elements are fully reflected toward the MPO connector 6, and another technique to sense the optical signals is inevitable. The optical signals provided from the MPO connector 6 enters the lens block 10 from the front through the inner fiber 11 and are converted into the collimated beams by the lens elements 10d in the front surface of the lens block 10. The collimated beams are bent in the optical axes thereof by 90° by the reflecting surface 10a and concentrated onto the PD 9d mounted on the assembly substrate 9.

The lens block 10, as shown in FIG. 5B, also provides a pair of guide pins 10f in the front surface thereof. Mating bores in the MT ferrule 11b with the guiding pins 10f, the optical alignment between the lens element 10d and the ends of the inner fiber 11 exposing at the surface of the MT ferrule 11b may be automatically carried out. Also referring to FIG. 5B, the lens block 10 provides guide pins 10g protruding upward, which are to be mated with alignment holes 9g of the assembly substrate 9 as shown in FIG. 6. Mating the guide pins 10g with the respective alignment holes 9g, the optical alignment between the lens elements, 10b and 10c, and the optical devices, 9c to 9e, mounted on the assembly substrate 9 may be automatically carried out. Because the alignment holes 9g are arranged in side of the optical devices, 9c or 9d, the optical alignment between the lens elements, 10b and 10c, in the lens block 10 and the optical devices, 9c or 9d, becomes in precise; that is, the alignment holes 9g are provided in respective positions to perform the optical alignment between the optical devices, 9c or 9d, and the lens elements, 10b and 10c, in precise.

Referring to FIG. 6, the assembly substrate 9 provides a plurality of pads 9i whose positions correspond to spacers 10h formed in the lens block 10, which are shown in FIG. 5B. The optical and electrical devices, 9c to 9f, are mounted on respective die pads on the assembly substrate 9. The pads 9i may be formed concurrently with the formation of the die pads and have thicknesses substantially same with thicknesses of the die pad. Thus, a reference level for the optical and electrical devices on the assembly substrate 9, that is, the top level of the die pad mounting those devices thereon may be aligned with the reference level for mounting the lens block 10. Because the thickness of the die pads for the devices are scattered, the optical coupling efficiency between the optical devices, 9c and 9e, mounted on the die pad and the lens elements, 10b and 10c, of the lens block 10 fluctuates. The lens block 10 of the present invention is to be mounted on the pads 9i with the thickness substantially same with that of the die pads for the devices, the optical coupling efficiency between the lens elements, 10b and 10c, and the optical devices, 9c to 9e, may become stable.

The assembly substrate 9 of the invention mounts no elements, namely, electronic components and optical components, on the top surface 9h thereof, which secures stable contact between the top surface 9h of the assembly substrate 9 and the top housing 4 and the effective heat dissipating path from the assembly substrate 9 to the top housing 4.

Figure 7:
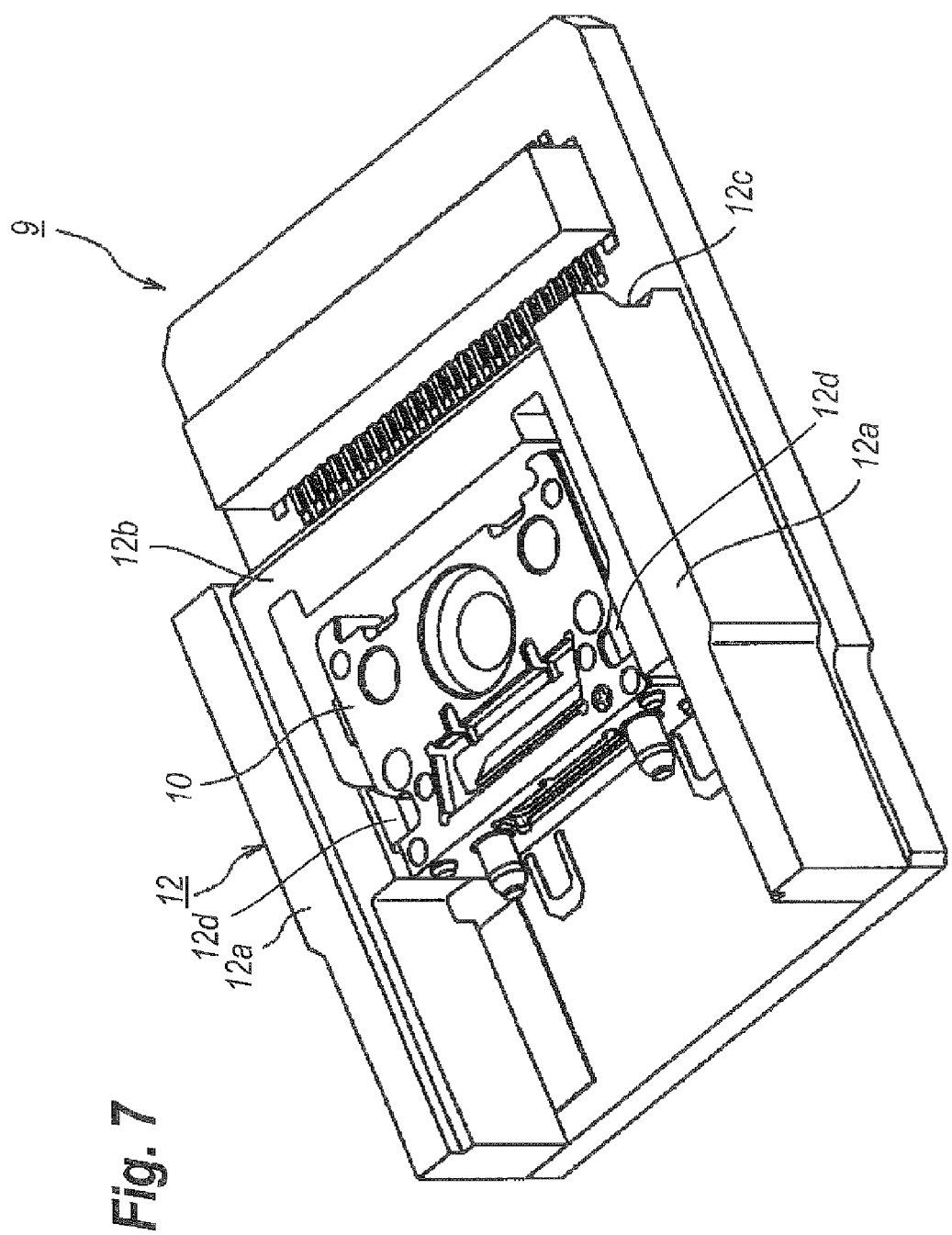
FIG. 7 is a perspective view of a holder and the lens block mounted on the assembly substrate.
Figure 8:
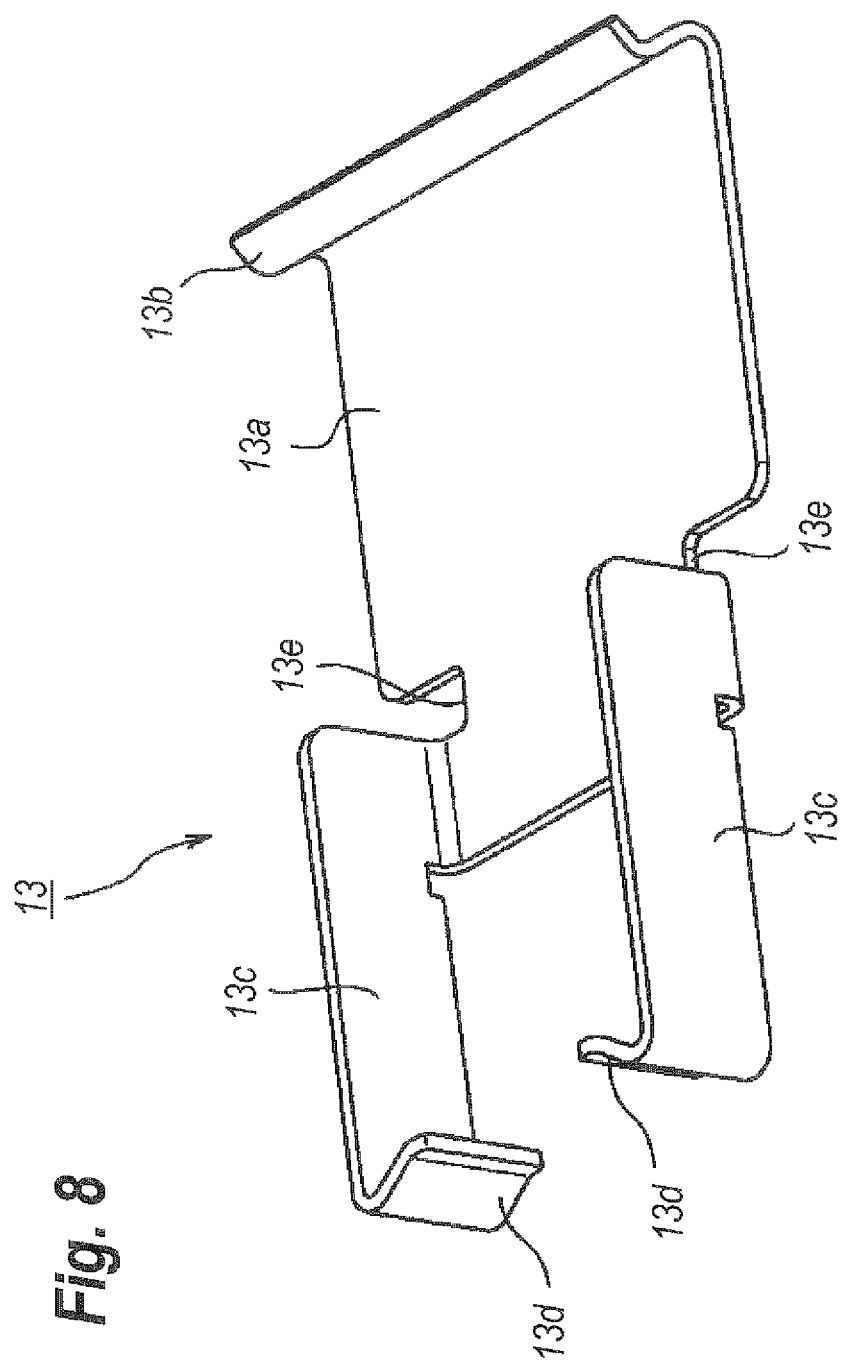
FIG. 8 is a perspective view of a clip to be assembled with the lens block.
Figure 9:
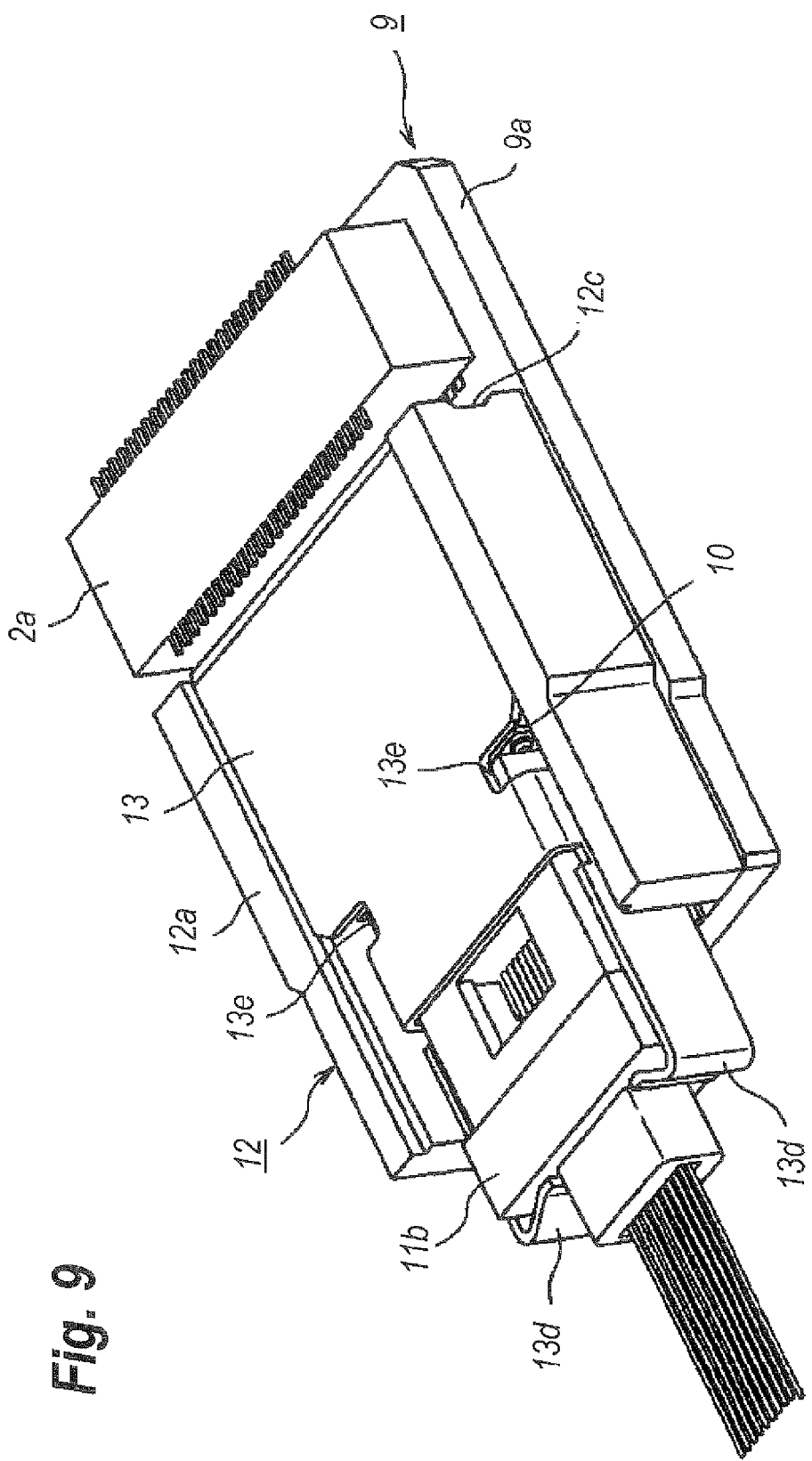
FIG. 9 is a perspective view of an intermediate assembly including the lens block, the holder, and the clip where they are mounted on the assembly substrate and the lens block is mated with an MT ferrule through the clip.

Optical coupling between the MT ferrule 11b and the lens block 10 will be described as referring to FIGS. 7 to 9. FIG. 7 shows the holder 12 and the lens block 10 mounted on the assembly substrate 9 viewed from the front bottom; FIG. 8 shows the clip 13 to be assembled with the lens block 10 viewed from the front top; and FIG. 9 shows an intermediate assembly including the lens block 10, the holder 12, and the clip 13 viewed from the front bottom, where they are mounted on the assembly substrate 9. FIG. 9 also shows the stack connector 2a mounted on the circuit board 2.

As shown in FIG. 7, the holder 12, which has a plane shape of a C-character having two side walls 12a and a rear wall 12b, sets the lens block 10 in a space surrounded by the side walls 12a and the rear wall 12b. The side walls 12a longitudinally extends, while, the rear wall 12b, which connects rear ends of the side walls 12a, laterally extends. The side walls 12a have heights greater than a height of the rear wall 12b. Referring to FIG. 9, hooking the clip 13 with the lens block 10, the clip 13 does not protrude from the side walls 12a. A hollow 12c provided in the rear wall 12b may hook the clip 13. The holder 12 may be made of resin.

Referring to FIG. 8, the clip 13 provides a primary surface 13a with a rectangular shape that covers the bottom surface of the lens block 10. A rear hook 13b extends from the rear edge of the primary surface 13a, while, two arms 13c extend from respective front sides of the primary surface 13a. The arms 13c, which extend in perpendicular to the primary surface 13a, provide other hooks 13d in respective ends thereof. Provided between the arms 13c and the primary surface 13a are cuts 13e. The arms 13c have a width smaller than the height of the holder 12. Accordingly, even the clip 13 is set with the lens block 10, the arms 13c do not protrude from the side walls 12a of the holder 12. The clip 13 thus arranged may be formed by cutting and bending metal plate. The rear hook 13b of the clip 13 engages with the hollow 12c in the rear wall 12b of the holder 12 and pushes the holder 12 front ward. On the other hand, the front hooks 13d latch the surface of the MT ferrule 11b facing the other MT ferrule 11a and push the holder 12 rearward. Thus, the clip 13 securely holds the holder 12 between two hooks, 13b and 13d, and makes the optical coupling between the MT ferrule 11b and the lens elements 10d of the lens block 10 in stable. The cuts 13e provided in respective sides of the primary surface 13a locate in the boundary between the MT ferrule 11b and the lens block 10. The physical contact between the MT ferrule 11b and the lens block 10 may be inspected through the cuts 13e.

Figure 10:
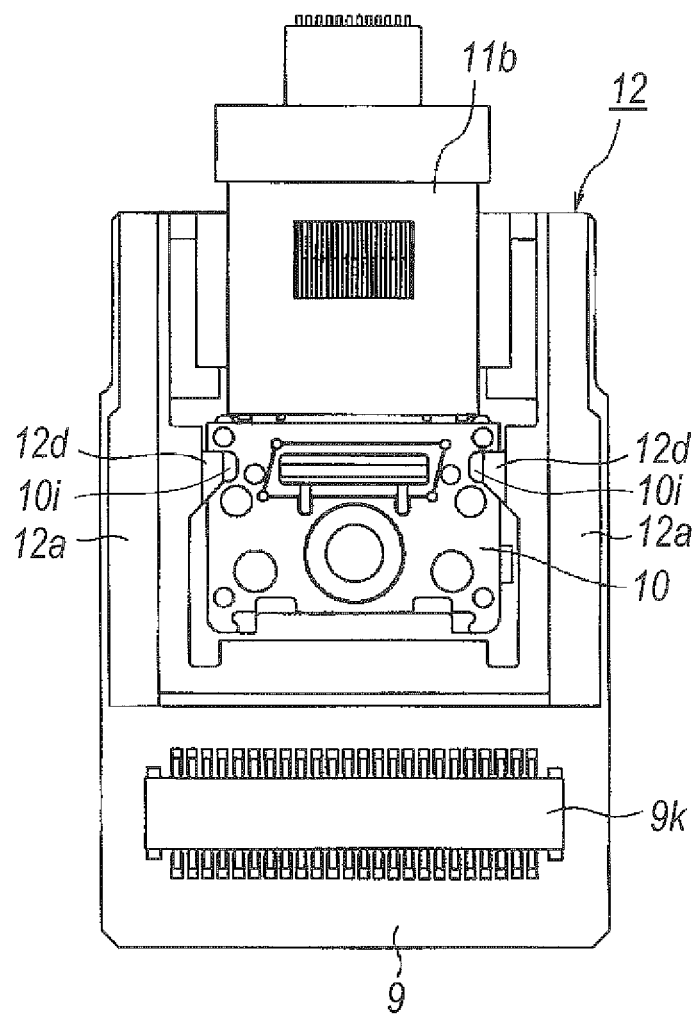
FIG. 10 is a plan view of the lens block, the holder, and the MT ferrule mated with the lens block.

A process to assemble the intermediate assembly including the assembly substrate 9, the lens block 10, the holder 12, the clip 13, and the MT ferrule 11b will be described as referring to FIG. 10, where FIG. 10 is a plan view of the lens block 10, the holder 12, and the MT ferrule 11b engaged with the lens block 10. The process first mounts the lens block 10 on the assembly substrate 9. As described, inserting the guide pins 10g into the alignment holes 9g of the assembly substrate 9, the optical coupling between the optical devices, 9c to 9e, on the assembly substrate 9 may be substantially performed by the insertion of the guide pins 10g into the alignment holes 9g. After the insertion, the lens block 10 is permanently fixed to the assembly substrate 9 by an adhesive. Next, mating steps 12d provided in respective side walls 12a of the holder 12 with cuts 10i provided in sides of the lens block 10, the holder 12 is attached to the assembly substrate 9. Thus, the holder 12 may be aligned with respect to the lens block 10. Finally, the MT ferrule 11b is mated with the lens block 10 from the front of the lens block 10 and engaging the clip 13 with the holder 12, the MT ferrule 11b is fixed to the lens block 10 as maintaining the optical coupling between the MT ferrule 11b and the front lens elements 10d of the lens block 10.

Figure 12A:
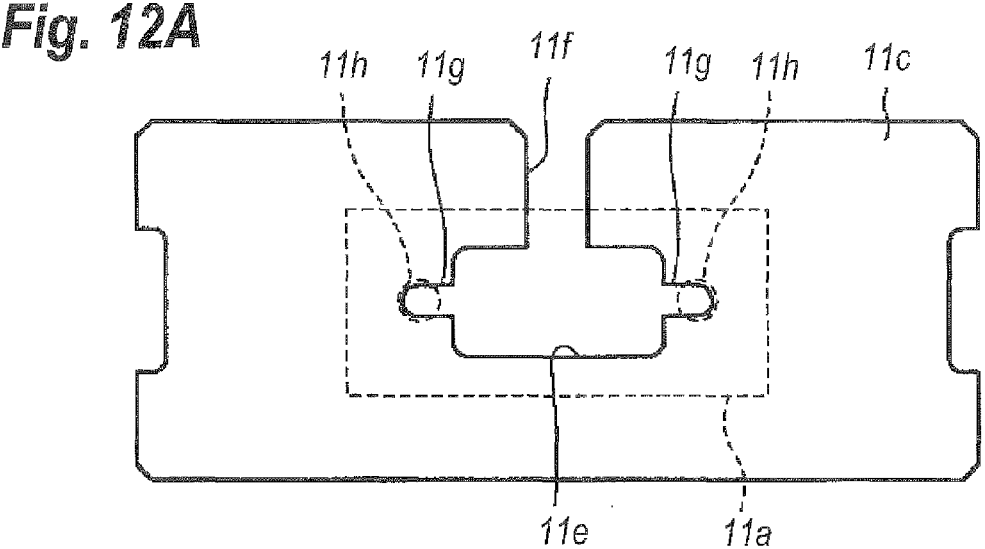
FIG. 12A is a plan view of a shield plate and FIG. 12B shows a shield plate assembled with the MT ferrule.

Next, the coupling between the MT ferrule 11a in the MPO connector 6 will be described as referring to FIGS. 11 to 12b, where FIG. 11 is a perspective view of the MPO connector 6 and the MT ferrule 11a each mounted on the bottom housing 5, which is viewed from rear top; FIG. 12A is a rear view of a shield plate 11e, and FIG. 12B shows a shield plate assembled with the MT ferrule 11a.

Referring back to FIG. 3, the MPO connector 6, which is assembled between the top housing 4 and the bottom housing 5, secures the MT ferrule 11a providing in the front end of the inner fiber 11. The MT ferrule 11a in a front end thereof couples with the MPO connector 6, while, a rear of the MT ferrule 11a provides the metal shield plate 11c. Also, when the MT ferrule 11a is set within the optical transceiver 1, an elastic member 17, which has a ringed shape surrounding the MT ferrule 11a, is secured between the MPO connector 6 and the shield plate 11c, and between the front and rear partition walls, 4a, 5b and 5a.

Referring to FIG. 12a, the MT ferrule 11a provides a pair of guide holes 11h into which respective guide pins 11d are set. The guide pins 11d in respective ends thereof expose within the MPO connector 6, while respective another ends expose in the rear of the shield plate 11c as shown in FIG. 11. The guide pins 11d each provide ring shaped grooves in respective middles, into which the shield plate 11c is set such that the guide pins 11d in the ends thereof are prevented from further protruding into the MPO connector 6.

Figure 12B:
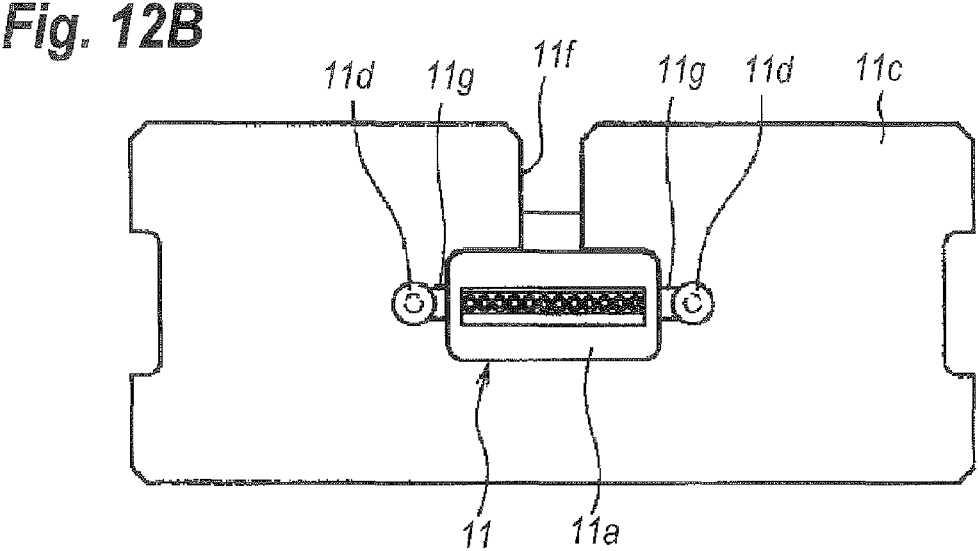

Referring to FIGS. 12A and 12B, the shield plate 11c provides in a center thereof a rectangular opening 11e and a slit 11f extending from an edge of the rectangular opening 11e to an outer edge of the shield plate 11c. The rectangular opening 11e corresponds to an outer shape of the MT ferrule 11a. Also, other slits 11g extend from other edges of the rectangular opening 11e continuous from the former edge to respective portions through which the guide pins 11d pass. The slits 11g have a width wider than a diameter of the ring shaped grooves in the guide pins 11d but narrower than a diameter of the guide pins 11d in portions out of the ring shaped grooves.

When the shield plate 11c is assembled with the MT ferrule 11a, the guide pin 11d in the ring shaped groove thereof is first inserted into the deep ends of the slits 11g. That is, the guide pins 11d are temporarily assembled with the shield plate 11c not the MT ferrule 11a. Next, the inner fiber 11 pierces the shield plate 11c in the rectangular opening 11e by inserting from the slit 11f along the arrayed direction of the inner fiber 11. Rotating the inner fiber 11 by about 90° in the rectangular opening 11e, the arrayed direction of the inner fiber 11 aligns along the longitudinal direction of the rectangular opening 11e. Sliding the shield plate 11c to the MT ferrule 11a as maintaining the relative rotational angle between the shield plate 11c and the inner fiber 11, the MT ferrule 11a is inserted into the rectangular opening 11e of the shield plate 11c as inserting the guide pins 11d into the guide hole provided in the MT ferrule 11a.

Then, the intermediate assembly of the MT ferrule 11a, the guide pins 11d, and the shield plate 11c thus assembled is set on the bottom housing.

The MT ferrule (hereafter denoted as an external MT ferrule) inserted into the MPO connector 6 abuts against the MT ferrule 11a in the MPO connector 6 (hereafter denoted as an inner MT ferrule). These three components of the external and internal MT ferrules and the MPO connector 6 requires the following conditions:

(1) enough abutting force is induced between two MT ferrules in order to optically couple the MT ferrules stably and reliably; and (2) enough small force is caused to the inner MT ferrule through the guide pins when the external MT ferrule is extracted from the MPO connector 6.

The present optical transceiver 1 may solve the subjects above. Specifically, the inner MT ferrule 11a in the rear end thereof is in contact to the shield plate 11c. When the pressure is caused rearward as inserting the external MT ferrule into the MPO connector 6, the shield plate 11c in respective side ends thereof abuts against the partition wall 5a of the bottom housing 5. Thus, the rear partition wall 5a behind the shield plate 11c may effectively absorb the rearward pressure applied to the inner MT ferrule 11a. On the other hand for the extracting force for the guide pin 11d, the guide pins 11d in the ring shaped groove thereof are set in the respective slits 11g of the shield plate 11c, which may effectively prevent the guide pins 11d from being extracted from the inner MT ferrule 11a. The shield plate 11c may effectively absorb the stress so as to extract the guide pins 11d from the inner MT ferrule 11a caused by the extraction of the external MT ferrule from the MPO connector 6 by abutting against the front partition walls, 4a and 5b, of the top and bottom housings, 4 and 5.

The optical transceiver 1 thus described has various advantages. For instance, the assembly substrate 9 mounts various devices that generate heat, and the assembly substrate 9 may be thermally and physically in contact to the top housing 4. Assuming an inner arrangement like a conventional optical transceiver where the bottom housing 5 mounts the assembly substrate 9, the heat generated in the assembly substrate 9 is once dissipated to the bottom housing 5, then conducted to the top housing 4, and finally radiated through the heat sink 60 provided in the cage that comes in physically contact to the top housing 4. Practically, a portion of the heat is dissipated directly from the bottom housing 5, major parts thereof are dissipated through the heat sink 60 because the thermal path from the bottom housing 5 to the heat sink 60 shows a highest efficiency for the heat dissipation. However, such a path from the assembly substrate 9 to the heat sink 60 through the bottom and top housings, 5 and 4, is inevitably lengthened. A technique to form the bottom housing 5 and/or the top housing 4 in thicker, which may enhance the heat conduction, makes the inner space smaller because the optical transceiver 1 of the present embodiment in the outer dimensions thereof follows the standard. Accordingly, a thicker housing inevitably results in a smaller inner space. Thus, the conventional arrangement of the assembly substrate in contact to the bottom housing is hard to secure the effective heat dissipation. The optical transceiver 1 of the present embodiment makes the assembly substrate 9 in directly contact to the top housing 4, not the bottom housing 5, which may bring the enhanced heat dissipating function.

The top housing 4 is connected to the frame ground, in another words, the chassis ground, while, the assembly substrate 9 is connected to the signal ground. Exactly, the metal 9j provided in the back surface of the assembly substrate 9 is connected to the signal ground. Accordingly, electrical isolation is necessary when the assembly substrate 9 in the back surface thereof is in contact to the top housing 4. The optical transceiver 1 of the embodiment provides the frame 15 made of electrically insulating material between the assembly substrate 9 and the top housing 4. The frame 15 surrounds the thermal grease and prevents the thermal grease 14 from spilling out.

The frame 15 may be also made of elastic material, which causes the repulsive force against the assembly substrate 9 by being pushed from the top housing 4. Even when the assembly substrate 9 deforms by the repulsive force above described, the optical coupling between the MT ferrules, 11a and 11b, may free from the deformation because the two MT ferrules, 11a and 11b, are connected with the inner fiber 11 with excessive lengths. The inner fiber 11 may effectively absorb the deformation of the assembly substrate 9.

The optical transceiver 1 of the present embodiment provides the stack connectors, 2a and 9k, to connect the assembly substrate 9 electrically to the circuit board 2. However, the optical transceiver 1 may provide, instead of the stack connectors, 2a and 9k, a flexible printed circuit (FPC) board. The stack connectors, 2a and 9k, provided in the optical transceiver 1 of the present embodiment have advantages of:

(1) the stack connectors, 2a and 9k, is a type of the surface mount component whose pitch between nearest terminals may be narrowed to 0.25 to 0.40 mm, which is narrower than the pitch between the nearest terminals of 0.50 to 0.65 mm in the FPC board. A narrowed pitch may generate a surplus area for mounting other components.

(2) The dimensions of the stack connectors, 2a and 9k, may determine a distance between the assembly substrate 9 and the top housing 4. In order to secure the quality of an electrical signal conducted through a stack connector, the mating depth of the stack connector between a male and a female one is preferable as short as possibly, practically, 1.5 to 2.0 mm is preferable for the mating depth. When the stack connectors, 2a and 9k, has a height where the male and the female one is engaged is higher than a height of the lens block 10, the circuit board 2 is apart from the lens block 10 even when the circuit board 2 is extended to a portion of the MPO connector 6, which also widens an area where electronic components are mounted.

The optical transceiver 1 uses the thermal grease 14 for enhancing the heat conduction from the assembly substrate 9 to the top housing 4. However, a thermal sheet, instead of the thermal grease, may be applicable.

In the foregoing detailed description, the method and apparatus of the present invention have been described with reference to specific exemplary embodiments thereof. However, it will be evident that various modifications and changes may be made thereto without departing from the broader spirit and scope of the present invention. The present specification and figures are accordingly to be regarded as illustrative rather than restrictive.

What is claimed is:

1. An optical transceiver that is to be plugged into a cage of a host system, comprising:
   a multi-fiber push-on (MPO) connector that receives an external optical connector;
   an assembly substrate having a primary surface, the assembly substrate mounting a holder and at least a semiconductor optical device on the primary surface thereof, the semiconductor optical device having an optical axis substantially in perpendicular to the primary surface of the assembly substrate;
   a lens block mounted on the primary surface of the assembly substrate, the lens block bending the optical axis of the semiconductor optical device toward a direction substantially in parallel to the primary surface of the assembly substrate;
   a circuit board that mounts electronic circuits electrically coupled with the semiconductor optical device;
   at least an inner fiber that couples the lens block with the MPO connector; and
   a housing including a top housing and a bottom housing that form an inner space enclosing the MPO connector, the assembly substrate, the lens block, the circuit board, and the inner fiber therein,
   wherein the bottom housing mounts the circuit board thereon and the top housing is thermally and physically in contact to the assembly substrate,
   wherein the optical transceiver provides a plurality of the inner fibers in an arrayed form,
   wherein the assembly substrate mounts a plurality of the semiconductor optical devices,
   wherein the lens block provides a plurality of lens elements coupled with the respective semiconductor optical devices,
   wherein the arrayed fiber provides a first mechanically transferable (MT) ferrule in an end thereof, and a second MT ferrule in another end thereof, the first MT ferrule coupling with the MPO connector, the second MT ferrule coupling with the lens block, and
   wherein the holder surrounds the lens block.

2. The optical transceiver of claim 1,
   wherein the holder provides a clip that secures the second MT ferrule with the lens block.

3. The optical transceiver of claim 2,
   wherein the clip provides a rectangular surface, a rear hook in an edge of the rectangular surface, a pair of arms extending from both ends of an other edge of the rectangular surface opposite to the edge, and front hooks provided in respective ends of the arms, and
   wherein the rear hook latches the holder, and the front hook latches the second MT ferrule.

4. The optical transceiver of claim 2,
   wherein the holder provides a rear wall having a hollow latched with the clip and side walls that extending from respective sides of the rear wall and providing steps in respective inner surfaces thereof facing to each other, and
   wherein the lens block provides cuts in respective sides thereof, the cuts mating with the steps of the holder.

5. The optical transceiver of claim 1,
   wherein the holder has a thickness substantially equal to a length between the circuit board and the top housing.

6. The optical transceiver of claim 5,
   wherein the assembly substrate is electrically connected to the circuit board with a stack connector.

7. The optical transceiver of claim 1,
   wherein the assembly substrate further mounts electronic circuit electrically coupled with the semiconductor optical device.

8. The optical transceiver of claim 1,
   wherein the optical semiconductor devices includes a plurality of semiconductor laser diodes (LDs), a plurality of semiconductor photodiodes (PDs), and a plurality of monitor PDs as the semiconductor optical devices, and wherein the LDs and the PDs each have an arrayed form and are arranged in side by side with respect to a longitudinal axis of the housing.

9. The optical transceiver of claim 8,
wherein the LDs each has a type of a vertical cavity surface emitting laser diode (VCSEL).

10. The optical transceiver of claim 1,
wherein the top housing is to be physically in contact to a heat sink provided in the cage of the host system when the optical transceiver is inserted in the cage.

11. The optical transceiver of claim 1,
wherein the assembly substrate is thermally in contact to the top housing via thermal grease.

* * * * *